United States Patent [19]
Johnson, Jr. et al.

[11] 3,901,600
[45] Aug. 26, 1975

[54] APPARATUS FOR MEASURING ENZYME CONCENTRATIONS USING AN OPTICAL INSTRUMENT SUCH AS A SPECTROPHOTOMETER

[75] Inventors: Edgar G. Johnson, Jr.; Thomas E. Stonecypher, both of Huntsville; Charles V. Lawson, Arab, all of Ala.

[73] Assignee: Micromedic Systems, Inc., Philadelphia, Pa.

[22] Filed: Feb. 19, 1974

[21] Appl. No.: 443,532

[52] U.S. Cl. .................. 356/88; 356/93; 356/205
[51] Int. Cl. ............................................. G01j 3/42
[58] Field of Search ........... 356/88, 93, 94, 95, 201, 356/205, 206

[56] References Cited
UNITED STATES PATENTS
3,664,744    5/1972    Liston .................................. 356/93

*Primary Examiner*—Vincent P. McGraw
*Attorney, Agent, or Firm*—Seidel, Gonda & Goldhammer

[57] ABSTRACT

Enzyme concentration at a fixed temperature is measured in terms of change in absorbance per unit time over selected time intervals. The rate of change of the absorbence is electronically calculated from the output of a spectrophotometer. Two modes of operation are provided to accommodate either increasing or decreasing changes in absorbance.

19 Claims, 3 Drawing Figures

APPARATUS FOR MEASURING ENZYME CONCENTRATIONS USING AN OPTICAL INSTRUMENT SUCH AS A SPECTROPHOTOMETER

BACKGROUND OF THE INVENTION

Ordinarily, in order to measure the concentration of the sample fluid in a spectrophotometer it is only necessary to determine the optical density (the "absorbance") of the sample. Usually, the absorbance of the sample will remain constant with time. However, in the case of enzyme reactions, the absorbance of the sample will vary with time, the magnitude of the variation in absorbance over a selected time interval being a measure of the enzyme concentration.

In measuring the change in absorbance during an enzyme reaction, the reagents and the reaction conditions are chosen to produce a substantially linear change in absorbance in the selected time interval. Depending upon the type of enzyme reaction under test, the absorbance of the sample can either increase or decrease with time.

There are several routine methods for determining enzyme concentration. By way of example, any of the following methods may be used:

1. Recorder Output: A Recorder drives a sheet of paper at a constant speed and at a predetermined direction. Simultaneously, a recording pen is driven in a direction normal to the direction of the displacement of the paper. The swing of the pen is a function of the absorbance of the sample as determined by a spectrophotometer. The rate of change of the absorbance of the sample is determined manually be drawing a tangent to the curve traced by the recording pen at the selected observation time.

2. Fixed Print Cycle: A Printer prints instantaneous readings of absorbance or concentration at evenly spaced time intervals. The operator subtracts consecutive readings and then divides the remainder by the value of the time interval.

3. Manual Timing: A Timer — which may be as rudimentary as a stopwatch — determines the times at which absorbance readings are made. The operator subtracts consecutive readings and divides the remainder by the value of the time interval separating the consecutive readings.

4. Electronic Calculator or Computer: A conventional Electronic Calculator or Computer evaluates the data output of a spectrophotometer. Although this approach yields good results, the equipment entailed is expensive.

BRIEF SUMMARY OF THE INVENTION

The present invention is an advance over the prior art devices for making enzyme measurements by automatically determining the variations in the absorbance of a sample over selected time intervals. The resultant measurements may be stated in terms of change in absorbance per unit time or in terms of International Units (IUs) per liter. The invention includes an Enzyme Rate Analyzer which processes conventional spectrophotometric data. The input to the analyzer is a digitized representation of the relative absorbance of the sample fluid. In particular, the input is a burst of pulses of constant frequency, the duration of the burst being proportional to the logarithm of the ratio of two signals at the spectrophotometer output. One signal represents the absorbance of the sample fluid while the other signal represents the absorbance of a standard fluid (the "blank"). According to the well-known Lambert-Beer law, the aforementioned burst of pulses is, therefore, a relative measure of the absorbance of the sample fluid with respect to the absorbance of the blank. The relative absorbance of the sample is an index of the enzyme concentration.

Typically, enzyme concentrations are very low and, accordingly, extremely difficult to measure directly. However, the catalytic effect of the enzyme on the rate of reaction can be measured by determining the rate of change in absorbance of an appropriate sample, the rate of change of the absorbance being proportional to the enzyme concentration.

A principal advantage of the present invention is that it provides an electronic analyzer for data averaging and smoothing while furnishing increased resolution in the enzyme concentration measurement.

Another advantage of the present invention is that the print-out of the calculated result appears automatically in proper units of absorbance per unit time, despite the value of the time interval selected for the measurement.

For the purpose of illustrating the invention, there are shown in the drawings forms which are presently preferred; it being understood, however, that this invention is not limited to the precise arrangements and instrumentalities shown.

DETAILED DESCRIPTION OF THE INVENTION

Figure 1:
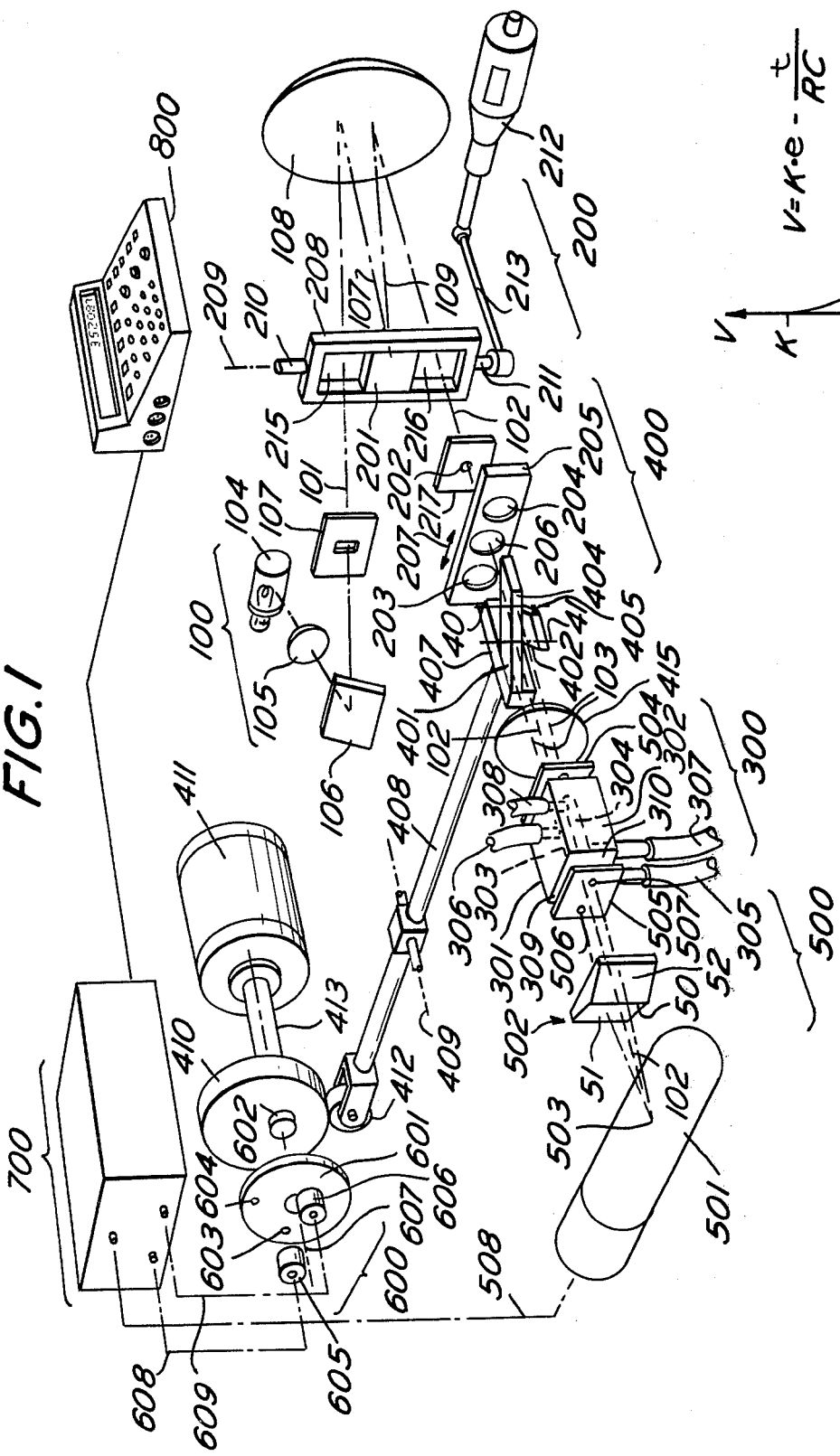
FIG. 1 is a diagrammatic perspective view of one embodiment of a spectrophotometer which may be used in the measurement of absorbance.

Referring now to the drawings in detail, wherein like numerals indicate like elements, there is shown in FIG. 1 a diagrammatic perspective view of a spectrophotometer which may be used in making the enzyme measurements hereinafter described. Such apparatus may also be used for making routine concentration measurements which require merely the determination of the absorbance of the sample fluid at any instant of time. In routine concentration measurements, the absorbance of the sample fluid will be constant with time.

In measuring the concentration of enzymes, the absorbance of the sample fluid may be made to vary linearly with time. The magnitude of the variation of the absorbance over a selected interval of time is an index of the enzyme concentration. More particularly, the slope of an absorbance vs. time curve is an index of the amount of the enzyme present in the sample fluid in International Units (IUs), an IU being the amount of an enzyme that will catalyze the transformation of 1 micromole of a substance per minute under defined conditions.

The device shown in FIG. 1 has other advantages as well. For example, for a properly behaved enzyme reaction, the rate of change of absorbance per unit time will be constant. In some cases, it may be desirable to determine the moment at which the rate of change of the absorbance has become constant as well as the magnitude of the constant rate. The present invention is directed to accomplishing those objects.

The apparatus illustrated in FIG. 1 is used to measure certain optical properties of the substance by determining the attenuation of a light beam in passing through that substance. Specifically, the measurement is made by comparing the attenuation caused by a sample of the substance to the attenuation caused by a standard substance (the blank). In this manner, a relative measurement of the property is derived, that is, the measurement of the property is made in terms of the blank.

The spectrophotometer illustrated in FIG. 1 includes the following main elements:

1. Beam-generating means 100 for generating a mixed wavelength beam of collimated light along axis 101;

2. Monochromator means 200 for selecting a monochromatic beam from the mixed wavelength beam and for directing the monochromatic beam along the optical axis 102 of the spectrophotometer;

3. Container means 300 including at least one pair of cuvettes 301 and 302 of which one cuvette serves to receive a sample fluid while the other cuvette serves to receive the blank (the optical absorbance of the sample is measured with respect to the optical absorbance of the blank — when the sample is a solution, the blank is, in most cases, the solvent, i.e., a "solution" with zero concentration);

4. Scanning means 400 for moving the aforesaid monochromatic beam, with respect to the pair of cuvettes, alternately between shifted optical axes 103 such that the sample and blank fluids are optically scanned by the monochromatic beam;

5. Light detector means 500 for delivering electrical signals representing the intensity of the monochromatic beam alternately passing through the sample and the blank;

6. Synchronization means 600 for delivering electric signals that are synchronous with the positions taken, or paths followed, by the monochromatic beam along shifted optical axes 103 due to scanning means 400, synchronization means 600 being mechanically linked to scanning means 400;

7. Signal processor 700 electrically connected to the detector means 500 and to the synchronization means 600, for sorting the signals attributable to the blank from the signals attributable to the sample, for calculating the logarithm of the ratio of these signals, that is, the absorbance of the sample expressed in terms of the absorbance of the blank, and for digitizing the signal representing the relative absorbance of the sample; and 8. An enzyme rate analyzer and printer 800 for printing out the rate of change of the absorbance of the sample, at selected intervals of time, these numbers also representing a measure of the concentration of the enzyme.

Beam-generating means 100 comprises a light source 104 such as a lamp which generates white or mixed wavelength light, a condensor lens 105, a plane mirror 106, a diaphragm 107 having an aperture in the form of a slit, and a concave spherical mirror 108. The mirror 106 reflects the mixed wavelength beam emanating from light source 104 to diaphragm 107. The mixed wavelength beam, reflected from mirror 106, passes through the aperture in diaphragm 107 along optical axis 101 to vertical supporting frame 208 and spherical mirror 108.

Spherical mirror 108 reflects the mixed wavelength beam along optical axis 107 to grating 201. Grating 201 is part of the monochromator means 200. The mixed wavelength beam impinging on grating 201 along optical axis 107 emerges from grating 201 as a monochromatic beam along optical axis 109. The beam travels along optical axis 109 and is reflected by mirror 108 along optical axis 102. Thus, as shown in FIG. 1, the light beam traveling along optical axis 102 is a monochromatic beam.

The monochromator means 200 comprises a grating 201 and a diaphragm 217. Grating 201 selects the monochromatic beam from the mixed wavelength beam traveling along optical axis 107. Diaphragm 217 has an aperture 202 in the form of a circle for admitting the monochromatic beam traveling along optical axis 109.

Also included in monochromator means 200 is a slide 205 provided with three openings of which the central one 206 is empty and the remaining two of which are provided with optical filters 203 and 204, respectively. Slide 205 is slideably mounted in a fixed slideway (not shown) in order to permit reciprocating movement thereof in the directions of the double arrow 207. As a result, any one of the three openings, 203, 204 or 206, can be placed selectively along optical axis 102 on which the monochromatic beam travels.

Grating 201 is slideably mounted in the vertical supporting frame 208. Vertical supporting frame 208 is rotatable about the axis 209 by means of two pivots 210 and 211 which pivotally engage frame 208. The opening in frame 208 is of greater area than the area of the grating 201, thus permitting the adjustment of the position of grating 201 inside frame 208. Inside frame 208, the upper opening 215 is traversed by optical axis 101 and the lower opening 216 is traversed by optical axis 102.

The angular position of frame 208 is adjusted by micrometer screw 212 which is connected to frame 208 by a link 213. By pivoting frame 208 about axis 209, the monochromatic beam traveling along optical axis 109 will assume a variety of wavelengths. Thus, a particular wavelength from the monochromatic beam traveling along optical axis 109 is selected by adjusting the angular position of frame 208 by means of screw 212.

The micrometer screw 212 is mechanically coupled to a wavelength indicator (not shown) on the face of the instrument. Slide 205 is also mechanically coupled to micrometer screw 212 through a cam mechanism (not shown) which adjusts slide 205 according to the setting of micrometer screw 212, that is, according to the selected wavelength. In other words, selecting a wavelength by adjusting micrometer screw 212 causes filter 203 or 204 to be inserted in optical axis 102.

Filters 203 and 204 in slide 205 prevent extraneous parasitic visible light, for example, stray light or second order diffraction light from grating 201, from impinging on the sample or blank when the selected wavelength for the monochromatic beam lies in the red, near infrered (IR), or ultraviolet (UV) ranges. For a selected wavelength which lies in most of the visible range, there is no need for this precaution. Accordingly, filter 203 has a band width in the UV range and cuts any radiation having a wavelength greater than, say, 420 millimicrons. When the selected wavelength from the monochromatic beam lies in the UV range, filter 203 is inserted in optical axis 102. Similarly, filter 204 has a band width in the visible and IR ranges and will cut any radiation having a wavelength shorter than, say, 500 millimicrons. When the monochromatic beam has a selected wavelength in the red or near IR ranges, filter 204 is inserted in the optical axis 102.

The container means 300 includes a pair of cuvettes 301 and 302, each provided with a cavity, 303 or 304. Cavity 303 receives the blank fluid while cavity 304 receives the sample fluid. The axes of cavities 303 and 304 are parallel to each other and are coincident with shifted optical axes 103. As shown in FIG. 1, cavity 303 is connected by flexible tubes 305 and 306 to sources and drains (not shown) for the blank fluid and cavity 304 is connected by flexible tubes 307 and 308 to sources and drains (not shown) for the sample fluid. Conventional pumping may be provided for feeding the blank and the sample fluids to the appropriate cuvette cavities. In operation of the preferred embodiment shown, this feeding action is intermittent, that is, the cuvettes are filled and, after a fixed interval of time has elapsed, they are emptied and then re-filled. However, continuously operated pumping means may also be employed provided that the blank and sample fluids are sufficiently homogeneous and that the speed with which the cuvette cavities are replenished is not too great.

Both the front faces (not visible) and the rear faces 309 and 310 of cuvettes 301 and 302 are optically flat and parallel to each other. As a result, there is no deviation in the direction of a beam as it passes through a cuvette cavity. That is, the front and rear faces of each cuvette, 301 and 302, are made optically flat and parallel in order to ensure that a beam entering the cuvette along a normal to the front face thereof will emerge from the cuvette along a normal to the rear face thereof.

The scanning means 400 includes a pair of plates 401 and 402 with plane parallel faces (hereinafter, the "plate" 401 or 402) which are made of transparent material such as quartz, plastic or glass. As shown in FIG. 1, plates 401 and 402 are spaced apart and are in crosswise relationship to each other. The front face 405 of plate 402 lies in a plane which intersects the plane in which the front face (not visible) of plate 401 lies, thereby forming a dihedral angle having a vertex 40 along the line of intersection. Similarly, the back face 404 of plate 401 lies in a plane which intersects the plane in which the back face (not visible) of plate 402 lies, thereby forming a dihedral angle having a vertex 41 along the line of intersection. The distance along optical axis 102 separating the front and back faces of each plate 401 and 402 is greater than the distance (hereinafter, the "thickness") separating the front and back faces of each plate 401 and 402 taken along a line perpendicular to both faces. The increased thickness is due to the crosswise relationship of plates 401 and 402, neither plate 401 nor plate 402 extending in a direction perpendicular to the optical axis 102.

Plates 401 and 402 are securely mounted on a support 407 in a specific crosswise relationship, as previously mentioned. In particular, the plane defined by the normal to the front face of plate 401 and the optical axis 102 is parallel to the plane defined by the normal to the front face 405 of plate 402 and the optical axis 102. Also, the front faces of both plates 401 and 402 form equal angles with respect to the optical axis 102. Therefore, plates 401 and 402 are disposed so that the dihedral angle defined by the intersection of the planes in which the back faces of both plates lie is bisected by a plane which contains the optical axis 102 and the vertex 41. Since the front and back faces of each plate 401 and 402 are parallel to each other, and since the front faces, as well as the back faces, of the plates 401 and 402 form equal angles with respect to the optical axis 102, the dihedral angle formed by the intersection of the front faces of both plates 401 and 402 also will be bisected by the plane which contains the optical axis 102 and the vertex 40. In the preferred embodiment shown in FIG. 1, the front faces of plates 401 and 402 are mutually perpendicular so that axis 102 is separated by an angle of 45° from the normals to each front face. Due to the foregoing geometry, the beam traveling along axis 102 is shifted equal distances — but in opposite directions — by plate 401 and plate 402.

The support 407 is fixed to one end of a lever 408 which pivots about the axis 409. Axis 409 is parallel to the optical axis 102. A roller 412 is pivotally mounted on the other end of the lever 408. The roller 412 is driven by the eccentric 410. Eccentric 410 rollably engages roller 412 and is eccentrically mounted on shaft 413 which is driven by motor 411. In this manner, the members 401 and 402 undergo a reciprocating motion, each member being alternately inserted in optical axis 102, the path of the incident beam.

In accordance with the law of refraction of a light beam through a plate with plane parallel faces, the beam incident along axis 102 on plate 401 or 402 is refracted through the plate and emerges from the back face of the same plate along shifted optical axis 103 which is parallel to axis 102. That is, the incident beam is shifted in the plane of incidence—the plane which contains the incident beam and the normal to the front face of plate 401 or 402—while the direction in which the beam travels is not changed. The magnitude of the shift depends on the refractive index of plate 401 or 402, the thickness of the plate and the angle of incidence of the beam with respect to the normal to the front face of the plate. The beam emerging from the back face of the plate, then, jumps alternately from a path parallel to, but shifted to the right of, the beam incident along axis 102 to a path parallel to, but shifted equally to the left of, the axis 102. Accordingly, both emergent beams will be parallel to each other as well as the axis 102.

The refractive index and the thickness of the plate 401 or 402 are chosen so that the emergent beam shifted to the right of axis 102 coincides with the axis of cavity 303 in cuvette 301. Similarly, the refractive index and thickness of plate 402 are chosen so that the path of the emergent beam shifted to the left of axis 102 coincides with the axis of cavity 304 in cuvette 302. As a result, the alternating insertion of plates 401 and 402 in axis 102 causes the incident beam to jump alternately from cavity 303 to cavity 304. As shown, prior to entering cuvette cavity 303 or 304, the shifted beam is passed through lens 415 in order to improve the collimation thereof.

The light detector means 500 includes a photomultiplier tube 501 and a refracting prism 502. Prism 502 is made of a transparent material such as glass, quartz, or plastic. Specifically, prism 502 has a plane base (not visible) proximal to cuvettes 301 and 302, which base is perpendicular to the axes of cuvettes 303 and 304. The beam traveling along shifted optical axes 103, therefore, is alternately coincident with the axes of cavities 303 and 304 and impinges on the prism base along the normal thereto. Distal to cuvettes 301 and 302, the prism 502 is provided with two oblique planar faces 51 and 52 which form an obtuse dihedral angle along vertex 50. As shown, the dihedral angle formed by planes 51 and 52 is bisected by a plane which contains the optical axis 102 and vertex 50. Oblique faces 51 and 52 form equal solid angles with the aforesaid bisecting plane.

The beam which emerges from container means 300 —alternating along the axes of cavities 303 and 304— strikes the base of prism 502 and is refracted through prism 502 so that it emerges from distal oblique faces 51 and 52 and converges at point 503 on optical axis 102. Point 503 also lies on the photocathode of photomultiplier 501. Thus, the beam alternately emerges from blank cuvette 303 and from sample cuvette 304, continues through prism 502, whereby the beam is refracted — through either face 51 or 52 — back toward axis 102, and converges at point 503 on the photocathode.

Photomultiplier 501 is electrically connected to signal processor 700 as incidated by line 508 in FIG. 1. Since the beam alternately impinges on the same point 503 on the photocathode, the sensitivity of the photoelectric conversion will be the same for the beam shifted through cavity 303 as for the beam shifted through cavity 304.

Interposed between cuvettes 301 and 302 and prism 502 is diaphragm 505. Similarly, interposed between lens 415 and cuvettes 301 and 302 is diaphragm 504. Each diaphragm, 504 and 505, is provided with two apertures which are aligned with the axes of the cuvette cavities 303 and 304. For example, in diaphragm 504, apertures 506 and 507 are aligned with cavities 303 and 304, respectively. In a like manner, in diaphragm 504, the apertures (not shown) are aligned with the axis of the cuvette cavities 303 and 304. Diaphragms 504 and 505 serve to exclude parasitic light from falling or photomultiplier 501, ensuring that the electrical signal delivered by tube 501 is based solely upon the refracted beam emerging from lens 415.

Synchronization means 600 serves to generate signals which indicate on which cuvette cavity axis the beam lies. In particular, means 600 includes a disk 601 concentrically mounted on shaft 413. Disk 601 is provided with two permanent magnets 603 and 604 which are located equal distances from axis 607 on mutually perpendicular radii. In front of disk 601 are located two magnetically-activated switches 605 and 606 arranged in diametrically opposite positions with respect to the axis 607. In particular, the switches 605 and 606 are symmetrically located about axis 607 and are separated from axis 607 by the same radial distances as are magnets 603 and 604. In the preferred embodiment shown in FIG. 1, switches 605 and 606 are solid state switches although other suitable switches may be used without departing from the spirit or scope of the invention.

As disk 601 rotates about its axis 607, magnets 603 and 604 describe a common circular trajectory. Corresponding to the geometry previously described, switches 605 and 606 are located at opposite extremes of a diameter of this circular trajectory. Since each switch, 605 and 606, delivers an electrical impulse as magnets 603 and 604 are swept before the switch, one full revolution of disk 601 results in the generation of four impulses to signal processor 700. The electrical connection of switches 605 and 606 to signal processor 700 is indicated by the broken lines 608 and 609.

Moreover, the disk 601 is mounted on shaft 413, relative to eccentric 410, such that the upper and lower extremes of the movement of lever 408—due to the interaction of eccentric 410 and roller 412—will be indexed by two of the four impulses generated during each revolution of shaft 413.

Figure 2:
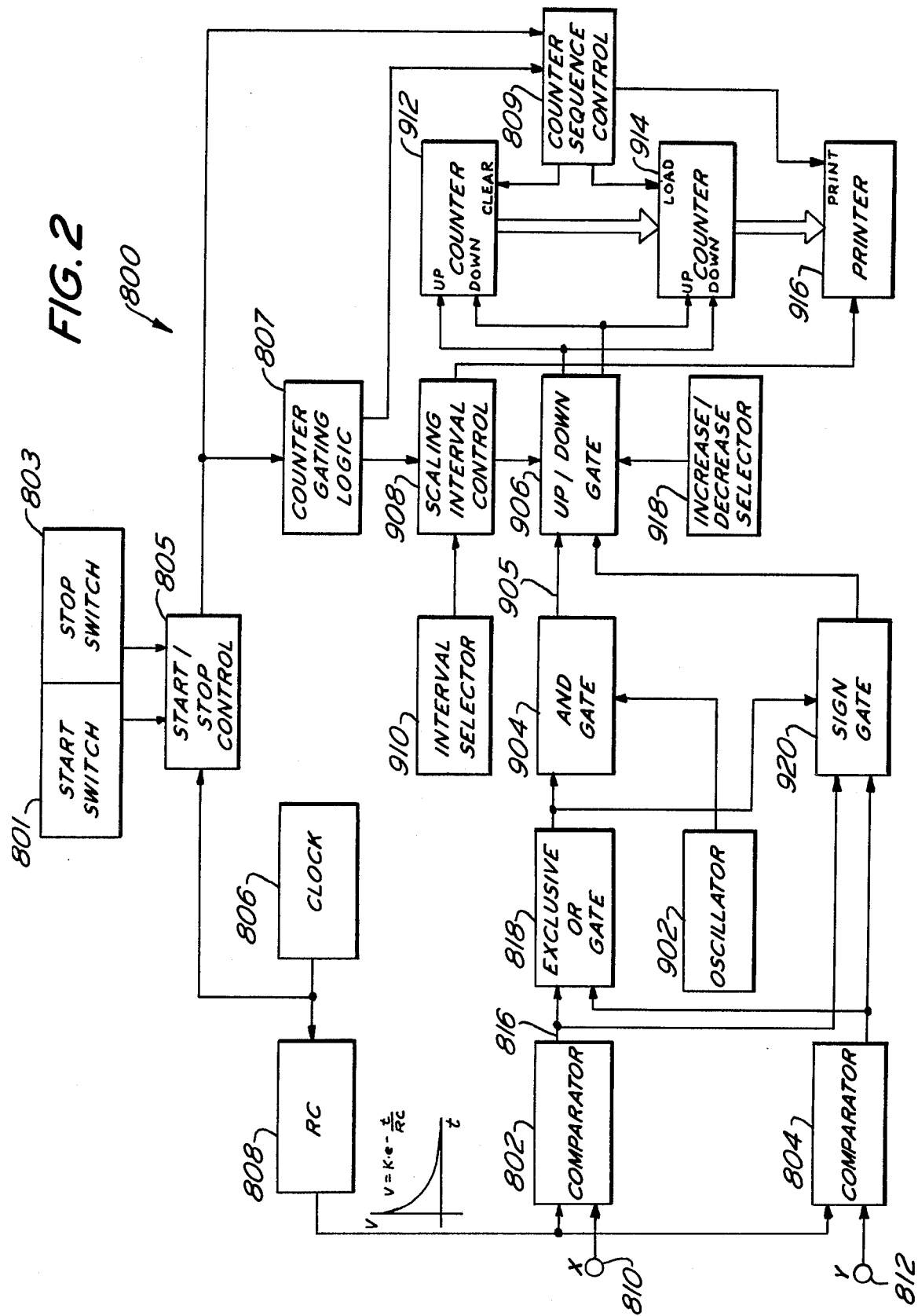
FIG. 2 is a schematic diagram, in block form, of an apparatus in accordance with the present invention.

Signal processor 700 includes an input amplifier (not shown) connected to tube 501. The amplifier is followed by a digital linear-to-logarithmic ratio converter, such as that described in U.S. Pat. No. 3,664,744 for a Log Ratio Circuit for Double Beam Spectrophotometers issued to Liston. The amplifier may also be provided with a feedback circuit for purposes of "dark current compensation" such as that described in U.S. Patent application Ser. No. 355,827 for an Automatic Drift Compensating Circuit for Digital Spectrophotometer filed Apr. 30, 1973. The portion of the signal processor which provides the concentration and/or absorbance measurements is illustrated in FIG. 2. Also shown in FIG. 2 are relevant portions of the Enzyme Rate Analyzer and Printer 800.

The output of photomultiplier 501 depends upon the optical density of the sample or blank fluids in cuvette cavities 303 or 304. Synchronization means 600 governs the electronic switching (not shown) which results in the generation of a signal having an amplitude which is proportional to the light transmitted through each cuvette cavity 303 or 304. That signal is sorted and stored in a memory device (not shown) such as a sample-and-hold circuit. Thus, the voltage stored in the memory device will be proportional to the voltages derived from photomultiplier 501 corresponding to the light transmitted through the blank and sample cavities 303 and 304.

Referring now to FIG. 2, the blank and sample voltages, X and Y, generated by photomultiplier 501 are fed to the input terminals of two separate comparators 802 and 804. If desired, these voltages may be adjusted prior to comparators 802 and 804 by means of variable potentiometers or voltage dividers (not shown). In addition to the sample or blank voltage generated by the photomultiplier tube 501, each comparator 802 and 804 receives an exponentially decaying pulse which is generated by resistor-capacitor (RC) circuit 808 in response to Electronic Clock 806. Each comparator 802 and 804 generates a signal when the exponentially decaying pulse generated by circuit 808 falls below the threshold signals X and Y, respectively.

By feeding the outputs of comparators 802 and 804 into an Exclusive Or gate 818, a rectangular pulse is formed at the output of gate 818. The duration of the gate 818 rectangular output pulse, therefore, is modulated by the logarithm of the ratio of the comparator inputs X and Y. This pulse width modulation feature will be described further — in mathematical terms — below. Comparators 802 and 804, then, serve as linear-logarithmic converters.

Figure 3:
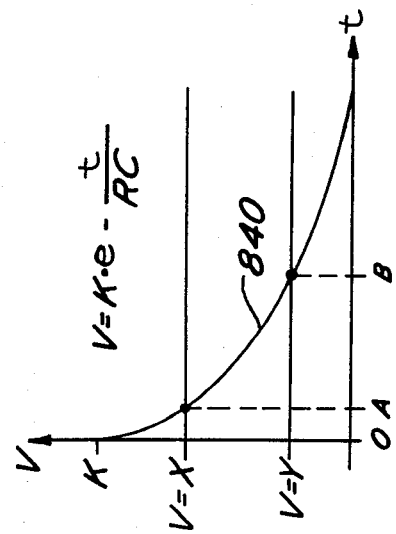
FIG. 3 is a diagram of certain waveforms used in the present invention.

At the beginning of a cycle, Clock 806 triggers the discharge of a capacitor in RC circuit 808. This results in the well-known voltage decay curve illustrated in FIG. 3. In FIG. 3, the character V represents voltage and the character $t$ represents time. It should be noted that by a change of scale in the exponent, the voltage decay curve may be expressed in terms of a base other than the natural base $e$. However, the ensuing discussion will refer to the voltage in terms of the natural base $e$ for convenience sake. As previously mentioned, RC circuit 808 supplies the input waveform to comparators 802 and 804. The other inputs of comparator 802, namely, signal X at terminal 810, and of comparator 804, namely, signal Y at terminal 812, are proportional to the photomultiplier 501 output, as already described. Signals X and Y are displayed in FIG. 3 as the constant voltage thresholds V=X and V=Y along the ordinate of the V vs. $t$ curve. Although voltages X and Y are assumed to be constant during the decay period of the RC circuit 808, these signals may actually fluctuate linearly with time. For purposes of discussion, however, voltages X and Y will be regarded as constant.

Comparator 802 generates an input to Exclusive OR gate 818 when the exponentially decaying signal generated by RC circuit 808 falls below the threshold signal X. Assuming that voltage Y is less than voltage X, at the time (time A) that the exponentially decaying signal generated by RC circuit 808 falls below the threshold X, the signal will not have decayed sufficiently to fall below the threshold Y. Accordingly, comparator 804 will not generate an output signal at time A. The input to Exclusive OR gate 818 at time A, then, will result in an output signal which is fed to AND gate 904.

The comparators 802 and 804 and the Exclusive OR gate 818 remain in this condition until the time (time B) at which the exponentially decaying signal falls below the threshold Y. At time B, both comparators 802 and 804 generate output signals and, consequently, Exclusive OR gate 818 ceases to supply a signal to AND gate 904. It should be evident that, from time A to time B, Exclusive OR gate 818 supplies a rectangular pulse whose width is modulated by the rate of decay of the signal illustrated in FIG. 3 and the magnitudes of the voltage thresholds X and Y. Cast in other terms, for a fixed rate of decay of the RC circuit 808 output signal, Exclusive OR gate 818 generates a pulse width modulated signal which is a function of the magnitude of the difference between the threshold voltages X and Y. This may be demonstrated readily by the mathematical derivation appearing below. In the following, the natural logarithm is denoted by the symbol ln. The exponentially decaying signal generated by RC circuit 808 is described by the equation:

$$V = Ke^{-t/RC} \quad (1)$$

By taking the natural logarithm of equation (1) the following equation results:

$$\ln (V/K) = -t/RC \quad (2)$$

Upon rearranging the terms in equation (2) an expression for the time $t$ results:

$$t = -RC \ln (V/K) \quad (3)$$

Since $V = X$ at $t = A$ and $V = Y$ at $t = B$, the time duration for the rectangular pulse generated by Exclusive OR gate 818 is given by:

$$/B - A/ = /RC [\ln (Y/K) - \ln (X/K)]/ = /A - B/$$

And since $\ln (m) - \ln (n) = \ln (m/n)$ then:

$$/B - A/ = /RC \ln (Y/X)/ = /A - B/$$

Thus, the Exclusive OR gate 818 generates a pulse width modulated signal, the pulse width being a logarithmic function of the ratio of the signals X and Y.

As explained previously, the signals X and Y are proportional to the light transmitted through blank and sample cuvette cavities 303 and 304. Consequently, the pulse width modulated signal at the output of Exclusive OR gate 818 is an analog representation of the relative attenuation of the sample fluid with respect to the blank fluid. This analog signal can be converted to a digital number by gating pulses through AND gate 904. For this purpose, fixed frequency oscillator 902 is fed to the input of AND gate 904. The number of fixed frequency pulses passed by AND gate 904 depends upon the magnitude of the pulse width $/B - A/$. Thus, the number of fixed frequency pulses passed by AND gate 904 is a logarithmic function of the ratio of the voltages X and Y.

The Start/Stop Control 805 controls the operation of the Counter Gating Logic 807 by Electronic Clock 806 which operation otherwise would be free-running. Thus, Clock 806 controls the Counter Gating Logic 807 only when the Control 805 is in the Start mode. As shown in FIG. 2, Control 805 is placed in the Start mode by switch 801. Similarly, Control 805 will be placed in the Stop mode by switch 803. The Counter Gating Logic 807 counts the pulses generated by Clock 806 and produces a corresponding output signal comprising a series of pulses. The output of Counter Gating Logic 807 is gated by Scaling Interval Control 908 which, in turn, is gated by Interval Selector 910.

The output signal generated by Scaling Interval Control 908 enables an Up/Down gate 906 which permits the fixed frequency pulses at the output 905 of AND gate 904 to be counted by Up/Down Counters 912 and 914. The order of counting, that is, either Up or Down, by Counters 912 and 914 is determined by Up/Down gate 906 by logically combining the output of Sign gate 920 with the output of Increase/Decrease Selector 918.

As previously explained, the signal at terminal 905 is a digitized representation (the "data conversion") of the relative absorbance or concentration of the sample fluid. The data conversion is in the form of a burst of fixed frequency pulses generated by Oscillator 902. The repetition frequency of the bursts is determined by the frequency of Clock 806, that is, the frequency at which the RC circuit 808 is triggered. In particular, the number of pulses in the data conversion is proportional to the relative absorbance or concentration of the sample fluid.

Up/Down Counter 912 accumulates the digital sum of a predetermined number of particular data conversions selected by Scaling Interval Control 908. More specifically, Scaling Interval Control 908 enables Up/Down gate 906 which gates the AND gate outputs — the data conversions — to Counters 912 and 914. The end of a summation is determined by Counter Gating Logic 807 which furnishes a control signal to the Counter Sequence Control 809. Also, at the end of the summation, Sequence Control 809 furnishes a "print" signal (except for the first summation made by Counter 912) to Printer 916 which, in response, prints out the contents of Counter 914. In addition, Sequence Control 809 supplies a "load" signal to Counter 914 whereby Counter 914 advances its count by the sum stored in Counter 912. At the same time, Sequence control 809 furnishes a "clear" signal to Counter 912, resetting Counter 912 to zero.

If the order of counting by Counter 912 is "down", Counter 912 will accumulate a negative number. As shown in FIG. 2, the counting order for Counter 914 is always opposite to the counting order for Counter 912. Consequently, when addition takes place in Counter 912, subtraction takes place in Counter 914. In this manner, Counters 912 and 914 calculate the relative change in absorbance or concentration of the sample over a selected time interval. As mentioned previously, the duration of the time interval over which a summation takes place is determined by Interval Selector 910. By way of example the duration of the interval selected may be 6, 15, 30 or 60 seconds.

In light of the preceding, the calculation of the relative rate of change in the absorbance or concentration of the sample fluid depends primarily upon the sequence of arithmetic functions performed by Counters 912 and 914. Specifically, at the beginning of the first summation interval — initiated by the operation of Start signal 810 — both Counters 912 and 914 are set at zero. It will be noted that Counters 912 and 914 are set at zero ("reset") by the Stop signal 803 when the power is applied initially to the unit.

At the beginning of the first interval of summation, Up/Down gate 906 signals Counter 912 to count "up" and Counter 914 to count "down". Thus, addition takes place in Counter 912 while subtraction takes place in Counter 914. At the close of the first interval of summation, Counter 912 stores the resulting sum, which, then, is transferred to Counter 914 in response to the load signal supplied by Counter Sequence Control 809. The first count of Counter 914 is not used. Following the transfer of the sum to Counter 914, Counter 912 is cleared by the Sequence Control 809 clear signal. Therefore, at the close of the first interval of summation, Counter 912 is reset to the zero state while Counter 914 stores the sum counted by Counter 912.

At the beginning of all successive intervals of summation, Counter 912 will contain a zero and counter 914 will contain the sum counted by Counter 912 in the immediately preceding summation interval. As Counter 912 forms the sum (the "current sum") corresponding to the particular summation interval, Counter 914 forms the difference between the current sum and the immediately preceding sum. At the conclusion of each summation interval, Counter 914 stores the difference in sums counted by Counter 912 corresponding to the two consecutive summation intervals. Upon termination of the summation interval, the difference in sums stored in Counter 914 is printed out; the current sum stored in Counter 912 is transferred to Counter 914; and Counter 912 is cleared. This sequence of steps will be repeated automatically by the unit but may be terminated manually by furnishing a Stop signal 803.

The Increase/Decrease Selector 918 is provided in order to maintain a positive number in Counter 914. That is, Selector 918 accounts for increasing or decreasing optical density of the sample fluid as a function of time so that a positive difference will always appear in Counter 914.

As already explained, at the end of each summation interval, Printer 916 prints out the difference number stored in Counter 914. In doing so, the Printer 916 omits the least significant digit in the difference number. This is equivalent to dividing the difference number by a factor of 10 with the result that the high resolution data is smoothed. However, fixed frequency oscillator 902 operates at a frequency which is exactly 10 times the frequency (the "basic frequency") that normally would be used for conventional, non-enzymatic measurements of absorbance. Therefore, Counters 912 and 914 count 10 times the number of pulses that would ordinarily be present at the output of AND gate 904 in routine measurements of concentration. By neglecting the least significant digit the aforementioned multiplication of the basic frequency is accounted for.

The number of Oscillator 902 pulses counted in any given summation interval depends upon the length of the Exclusive OR gate 818 output pulse and the frequency of the Clock 806 pulses. the period of the pulses generated by Clock 806 is fixed at 300 milliseconds by a count-down circuit (not shown) which counts pulses derived from the ac power line frequency. Assuming a power line frequency of 60 hertz, the count-down circuit divides the line frequency by a factor of 18 in order to provide an output at every 18th cycle of the ac power signal. Similarly, for an ac power line frequency of 50 hertz, the count-down circuit divides by 15 in order to produce a 300 millisecond period for the pulses generated by Clock 806.

The interval over which a summation takes place is controlled by Interval Selector 910, the selection being made manually. As mentioned previously, by way of example, the duration of a summation interval may be 6, 15, 30 or 60 seconds. The Scaling Interval Control 908, in response to the signal supplied by the Interval Selector 910, determines the particular data conversions to be counted as well as the total number of such data conversions. Specifically, the Scaling Interval Control 908 scales the number of data conversions corresponding to the particular summation interval selected so that the difference number printed out of counter 914 will be in units of change in absorbance per minute. Further, Control 908 permits the use of data conversions distributed more or less equally in time as opposed to the use of data conversions only at the beginning and end of the summation interval. By way of example, Table 1 below indicates the particular data conversions sampled and the total number of such conversions used for four representative summation intervals.

Table 1

| Time Interval | Number of Data Conversions | Distribution of Data Conversions Used | Total Number of Conversions Used |
| --- | --- | --- | --- |
| 6 seconds | 20 | First 10 | 10 |
| 15 seconds | 50 | First 40 | 40 |

Table 1

| Time Interval | Number of Data Conversions | Distribution of Data Conversions Used | Total Number of Conversions Used |
|---|---|---|---|
| 30 seconds | 100 | Every 4th | 20 |
| 60 seconds | 200 | Every 16th | 10 |

Thus, referring to Table 1, the number of data conversions in a 60 second summation interval is $60 \div 300 \times 10^{-3} = 200$ data conversions. However, Scaling Interval Control 908 governs Up/Down gate 906 such that only every 16th data conversion is counted by Counters 912 and 914 until 10 data conversions have been accumulated. Summing only every 16th data conversion corresponds to summing at a period of $16 \times 300$ milliseconds = 4.8 seconds. Consequently, the 10 data conversions are actually accumulated over a 48 second period.

Up/Down Counter 914, which determines the difference in the total number of Oscillator 902 pulses at the beginning and at the end of the 60 second interval, then, will contain a number that is 100 times the actual change in absorbance over the 1 minute interval. The magnification by the factor 100 is attributable to the fact that Oscillator 902 is operating at 10 times the basic frequency and the fact that there are 10 data conversions in the summation interval. However, since Printer 916 does not print the least significant digit, the magnification is reduced by a factor of 10 so that the printed number represents 10 times the actual change in absorbance. In order to print out the correct change in absorbance per minute, the Scaling Control 908 selects a decimal point one point to the left of the decimal point location in the number representing change in absorbance. In this manner, the difference number in Counter 914 is printed out every minute in units of absorbance per minute.

The operation of the unit is similar for other selected summation intervals. For instance, assuming a summation interval which is 6 seconds in duration, there will be 20 data conversions. Only the first 10 will be summed. Again, the Oscillator 902 frequency and the number of samples yields a multiplication factor of 100. However, the omission of the least significant digit reduces the factor 10-fold. The remaining factor of 10 is automatically compensated for since the enzyme reaction takes place in only one-tenth of a minute. Thus, the difference number read out of Counter 914 already is expressed in units of change in absorbance per minute and the decimal point can remain at the same location in the number representing change in absorbance per se. As in the example provided regarding a one minute summation interval, the change in absorbance per minute is printed out at the end of the summation interval, in this case 6 seconds. For a 30 second interval, 100 data conversions will be performed during the summation interval with every fourth data conversion being summed until a total of 20 have been accumulated. The number in Counter 914 will therefore be 200 times—a factor of 10 due to the frequency of Oscillator 902, and a factor of 20 due to the 20 data conversions—the change in absorbance per se over the one-half minute interval. But, by printing out the difference number in Counter 914 without the least significant digit, and by shifting the decimal point one place to the left, the print out represents change in absorbance per minute, bearing in mind that the summation interval is only one-half a minute in duration. Finally, for a 15 second summation interval, 50 data conversions are performed during the summation interval, the first 40 of these being summed. The result is a difference number in Counter 914 that is 400 times the change in absorbance per se over the 15 second interval. But, by omitting the least significant digit and by shifting the decimal point in the number representing absorbance per se one place to the left, the result is expressed in units of absorbance per minute.

From the foregoing, it should be evident that, notwithstanding the summation interval chosen, the difference number printed out by Printer 916 can always be stated in dimensions of change in absorbance per minute. In addition, it is also possible to print out a number in terms of IUs per liter. This may be accomplished simply by multiplying the change in absorbance per minute times a conversion factor which is known for each particular enzymatic protocol.

As mentioned previously, two modes of operation may be selected for Up/Down Counter 914. First, when the optical density of the sample fluid is decreasing the counter can operate initially in a count-up mode. On the other hand, when the optical density of the sample fluid is increasing, the counter can operate initially in a count-down mode. As a result, the number printed out from counter 914 will be positive except in certain special enzyme reactions. In the latter cases, the absorbance appears initially to decrease with time, pass through zero, and then increase with time. This phenomenon is due to the use of difference measurements derived by alternately passing a monochromatic beam through both the sample and blank cuvette cavities 303 and 304. The particular enzyme reaction either has an increasing absorbance when the blank has a greater absorbance than the sample or the enzyme reaction has a decreasing absorbance when the blank has an absorbance less than the sample. In any case, the problem can be avoided by specifically designating the sample and blank using the electronic Sign Sensing gate 920 to determine which cuvette cavity, 303 or 304, has the greatest absorbance. Sign gate 920 may be a bistable circuit which determines which of the comparators, 802 or 804, is providing an output signal. According to the foregoing determination gate 920 controls Up/Down gate 906 in conjunction with Increase/Decrease Selector 918. Thus, an operator need only know if the enzyme reaction is characterized by an increasing or decreasing optical density. The proper mode of operation may be selected manually by means of Increase/Decrease Selector 918. The Sign gate 920 will then supplement this operation by maintaining the proper relationship between the blank and sample.

Finally, it should be noted that the use of an alternating monochromatic beam as described herein is particularly advantageous in measuring the change of absorbance in an enzyme reaction. Thus, should a chemical reaction simultaneously occur with the enzyme reaction under test, the blank can undergo the same extraneous chemical reaction as the sample but without the enzyme reaction. As a result, the effect of the extraneous chemical reaction on the change in absorbance can be avoided. That is, only the change in absorbance due to the enzyme reaction will be measured.

It should be apparent to those skilled in the art that the invention can be effected by means other than those described herein. For example, the Up/Down counters 912 and 914 may be connected to separate gate control logic circuits instead of the single Up/Down gate 906. Similarly, each Counter 912 and 914 could be connected separately to Printer 916. In this arrangement, each Counter would function similarly during alternate time intervals — one counter starting the count during a portion of a summation interval while the other operates in an Up/Down mode to get the difference signal. The stored count would then be used as a base for an up/down count in the next summation interval while the other Counter stores a count for the next succeeding interval.

The present invention may be embodied in other specific forms without departing from the spirit or essential attributes thereof. And, accordingly, reference should be made to the appended claims, rather than to the foregoing specification as indicating the scope of the invention.

We claim:

1. Apparatus for measuring changes in absorbance per unit time, comprising:
   means for periodically comparing substantially monochromatic radiation transmitted through an absorbing sample substance to substantially monochromatic radiation transmitted through a standard substance, and for generating a series of digital signals, each said digital signal representing one said periodic comparison and comprising a pulse train having a length proportional to the logarithm of the ratio of the intensity of the radiation passing through the standard substance to the intensity of the radiation passing through the sample, said ratio being proportional to the absorbance of the sample substance at the time of said periodic comparison;
   counter means for comparing the number of pulses generated during any two consecutive time intervals, each said time interval comprehending at least one said digital signal, said counter means also for producing a signal representative of the change in said digital signals per unit time.

2. Apparatus in accordance with claim 1, wherein said counter means includes means for evaluation the summation of said pulses generated during a time interval and for determining the difference between said summation and a stored summation from an immediately preceding time interval.

3. Apparatus in accordance with claim 1, wherein said means to compare substantially monochromatic radiation includes a spectrophotometer.

4. Apparatus in accordance with claim 2 wherein said counter means includes an up/down counter for evaluating said summation of said digital signals during said time interval.

5. Apparatus in accordance with claim 2, wherein said counter means includes:
   a first counter for evaluating said summation of pulses generated during a preselected time interval; and
   a second counter for receiving said summation from said first counter determined during the immediately preceding time interval, for evaluating the summation of said digital signals during a current preselected time interval, and for determining the difference between said first counter summation and said second counter summation.

6. Apparatus in accordance with claim 1, wherein said counter means includes:
   a first counter for evaluating the summation of said pulses generated during a preselected time interval and for storing said summation;
   a second counter for receiving said summation of pulses stored in said first counter and for using said received summation as a base from which said second counter digitally counts backwards one count for each pulse generated during the next succeeding preselected time interval so as to determine the difference between the number of pulses generated during each of the two succeeding time intervals.

7. Apparatus in accordance with claim 1, including means to select the length of said preselected time interval so that the number of digital signals comprehended thereby may be varied.

8. Apparatus in accordance with claim 6, including means for maintaining a positive count in said second counter regardless of whether the optical density of the sample is increasing or decreasing towards the optical density of the standard.

9. Apparatus in accordance with claim 1 including:
   means to select the duration of said time interval;
   reading means for reading and displaying said change in said digital signals; and
   control means responsive to said means to select the duration of said interval for causing said reading means to display said change in said digital signal in terms of fixed units of time regardless of the length of the selected interval.

10. Apparatus in accordance with claim 9 wherein said control means includes:
    clock means to cause said means to compare substantially monochromatic radiation to generate a plurality of digital signals during said selected time interval; and
    said control means including means to vary the number of said digital signals stored and compared to maintain said change in said digital signals in terms of fixed units of time.

11. Apparatus for measuring changes in absorbance per unit time, comprising:
    means for periodically comparing substantially monochromatic radiation transmitted through an absorbing sample substance to substantially monochromatic radiation transmitted to a standard substance, and for generating a series of digital signals, each said digital signal representing one said periodic comparison and comprisisng a pulse train having a length proportional to the logarithm of the ratio of the intensity of the radiation passing through the standard substance to the intensity of the radiation passing through the sample, said ratio being proportional to the absorbance of the sample substance;
    first counter means for counting the number of pulses applied thereto during each of a plurality of successive preselected time intervals;
    second counter means for receiving said count at the end of each said preselected time interval and for evaluating the difference between said count and the number of pulses applied to said second counter means during the next succeeding preselected time interval; and means for applying selected digital signals to each said counter means during each said preselected time interval.

12. Apparatus in accordance with claim 11, wherein said second counter means uses said count as a base from which said second counter means digitally counts one count backwards for each pulse applied to said second counter means during said next succeeding preselected time interval.

13. Apparatus in accordance with claim 11, wherein said first and said second counter means each include an up/down counter.

14. Apparatus in accordance with claim 11, including means to select the length of said preselected time interval so that the number of digital signals comprehended thereby may be varied.

15. Apparatus in accordance with claim 11, wherein each said preselected time interval comprehends a plurality of said digital signals.

16. Apparatus in accordance with claim 11, including means for maintaining a positive count in said second counter means regardless of whether the optical density of the sample is increasing or decreasing towards the optical density of the standard.

17. Apparatus in accordance with claim 11, including means for selecting which of said digital signals generated by said means for periodically comparing substantially monochromatic radiation are to be applied to said first and said second counter means.

18. Apparatus in accordance with claim 11 including:

means to select the duration of said preselected time intervals;

reading means for reading and displaying said difference evaluation; and control means responsive to said means to select the duration of said interval for causing said reading means to display said difference evaluation in terms of fixed units of time regardless of the length of the preselected interval.

19. Apparatus in accordance with claim 18 wherein said control means includes:

clock means to cause said means to compare substantially monochromatic radiation to generate a plurality of digital signals during said preselected time interval; and said control means including means to vary the number of said digital signals stored and compared to maintain said change in said digital signals in terms of fixed units of time.

* * * * *